Nov. 25, 1958  C. GRANET ET AL  2,861,656
HYDRAULIC DAMPER FOR VEHICLE SUSPENSIONS
Filed Sept. 20, 1955  4 Sheets-Sheet 2

INVENTORS
CHARLES GRANET
GEORGES ROLAND
ROBERT CRAUC
BY *Toulmin & Toulmin*
ATTORNEYS Nov. 25, 1958   C. GRANET ET AL   2,861,656
HYDRAULIC DAMPER FOR VEHICLE SUSPENSIONS
Filed Sept. 20, 1955   4 Sheets-Sheet 4
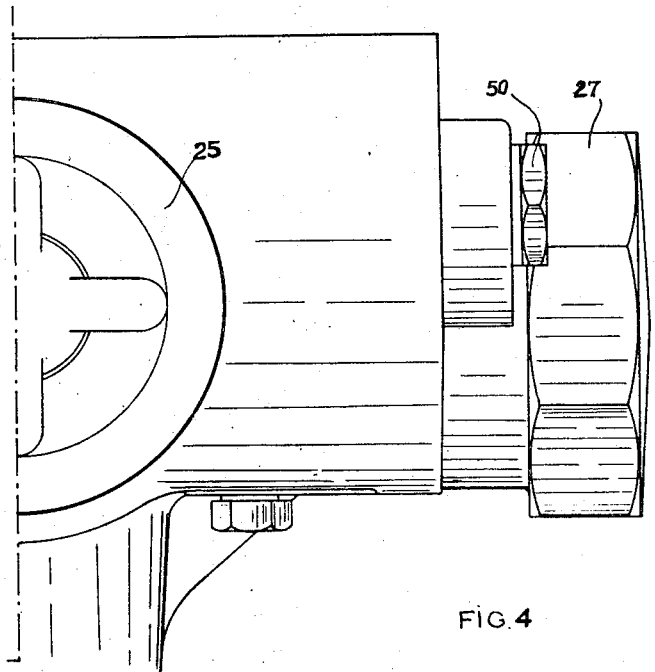
FIG.4
INVENTORS
CHARLES GRANET
GEORGES ROLAND
ROBERT CRAUC
BY 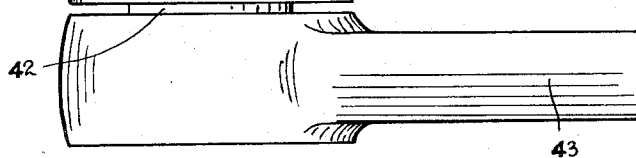
Attorneys

2,861,656

Patented Nov. 25, 1958

2,861,656

HYDRAULIC DAMPER FOR VEHICLE SUSPENSIONS

Charles Granet, Courbevoie, Georges Roland, Neuilly-sur-Seine, and Robert Crauc, Vanves, France Application September 20, 1955, Serial No. 535,425

Claims priority, application France September 22, 1954

3 Claims. (Cl. 188—88)

This invention relates to hydraulic shock absorbers for damping mechanical oscillations of an associated mechanism, e. g. a vehicle's suspension means, and to the combination with a vehicle of such an hydraulic shock absorber.

For such purposes it has long been known to use double-acting hydraulic shock absorbers in which the damping effect is obtained by laminar flow of hydraulic fluid through calibrated valves situated inside a hollow piston actuated by a crank fast on a shaft rotated by the oscillating member, and in which the said hollow piston slides in a cylinder whose axis is perpendicular to the centre line of the crank when the latter is in the mid-position for which the member subjected to oscillations is in its portion of equilibrium position.

Shock absorbers of this type have the disadvantage of acting differently in the two directions of the oscillations when the vehicle is under- or over-loaded. In fact, in one and the other of these two cases the rest position of the crank which displaces the double piston no longer coincides with the middle position which is perpendicular to the axis of the piston; it is inclined with respect to the said axis, and this is reflected in a displaced position of the piston which decreases its stroke towards one of the end of the cylinder and increases that in the opposed direction. Since in such devices the return of the fluid to the reservoir takes place in an identically similar manner from each of the end chambers of the cylinder through calibrated valves of constant and identical characteristics, the damper behaves differently according to the sense of displacement of the piston by the oscillation.

An object of the present invention is to improve hydraulic shock absorbers of the type above described with a view to giving them a symmetrical action whatever may be the load carried by the vehicle.

In the improved shock absorber of this invention, the hydraulic fluid enters the working chambers at the ends of the cylinder through non-return valves in the piston and the flow of fluid expelled from said chambers is controlled by other non-return valves having variable spring-loading, which is controlled by a cam fast on the shaft carrying the crank in such a way that as the crank is angularly displaced from its mid or neutral position in either sense the spring-loading is progressively increased, thus increasing the damping effect by opposing increased resistance to passage of the fluid through the valves, until a limiting angular displacement (which is the same in either sense) is reached, beyond which further angular displacement of the crank does not increase the spring-loading further.

When such a shock absorber is applied to the spring suspension of a vehicle, the shock absorber being anchored on the spring part of the vehicle and its crank shaft connected, by an external lever for instance, to the unsprung part of the vehicle, it being understood that the damper is appropriately adjusted with respect to the sprung and unsprung parts of the vehicle, the result of our improved construction is that, so long as the vehicle carries less than the maximum permissible load, the valves controlling the channels through which the fluid is expelled are held against their respective seats with a force which is not only a function of the amplitude of the oscillations, but likewise of the actual load of the vehicle, but when the vehicle is loaded beyond its maximum permissible load the effort with which the valves are held on their respective seats is a maximum and is independent of the amplitude of the oscillations. This arrangement offers the advantage of enabling a stiffness of suspension to be obtained which always corresponds with the load on the vehicle, so as to eliminate the detrimental feature of conventional shock absorbers residing in the fact that if such shock absorbers are adjusted for the maximum load they are too hard when the vehicle is travelling light, but too soft when the vehicle travels with full load with the dampers adjusted for the minimum loading.

Other objects and characteristics of the invention will appear from the following description of two constructional forms of the shock absorber as illustrated in the accompanying drawings, which description is given by way of example only and without implied limitation of the scope of the invention as defined in the appended claims. In the drawings:

Figure 4 is a partial plan view of the device of Figure 2.

Figure 1:
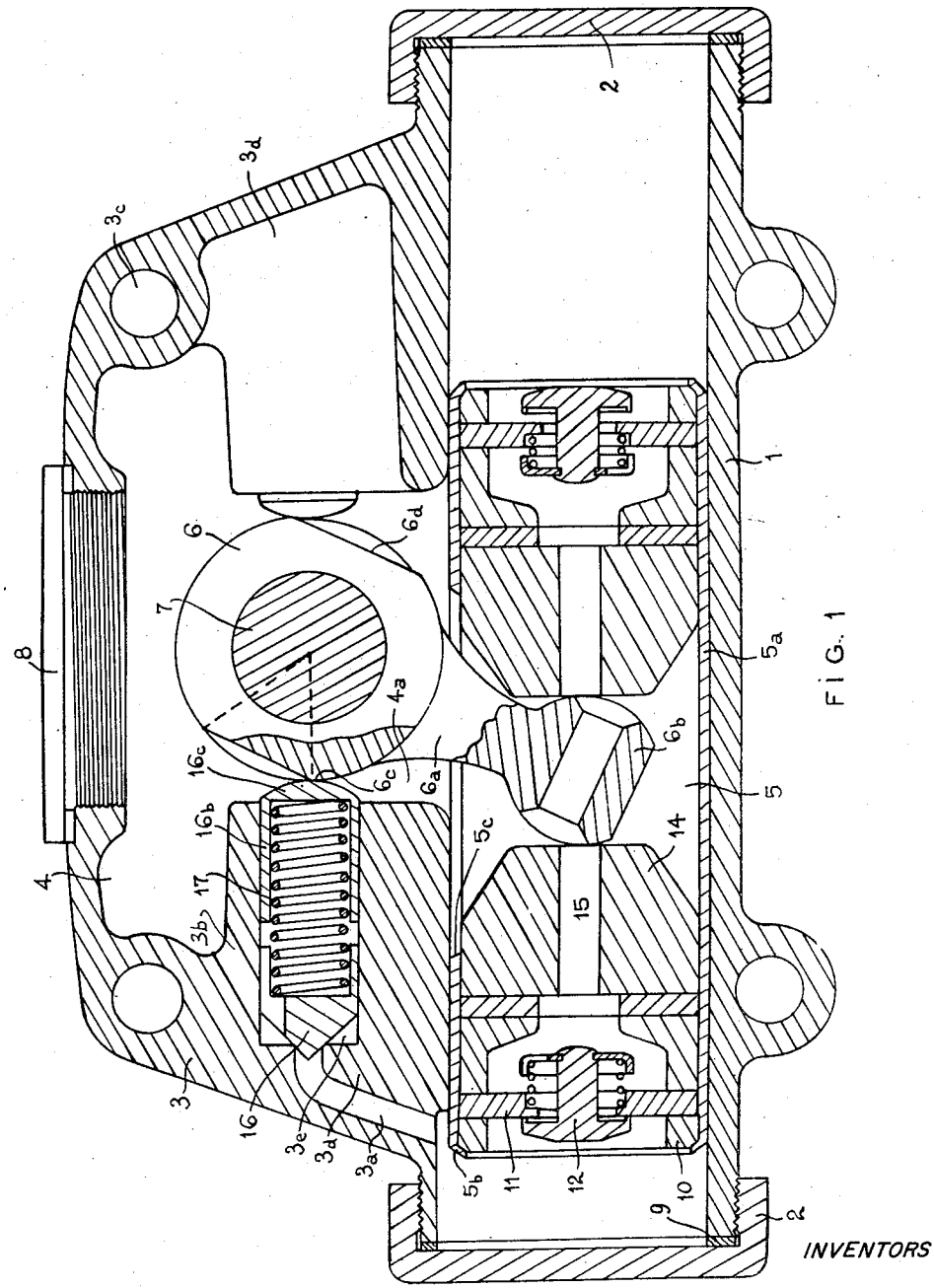
Figure 1 is an axial section of a first form of construction showing in section one only of the variably loaded valves.

In Figure 1 the body of the shock absorber, preferably of light metal cast in one piece, is bored through to afford a cylinder 1, closed at both ends by screw caps 2, and said body includes a hollow casing 3 whose cavity 4 communicates with the cylinder 1, on the one hand by a large central opening 4a and on the other hand by two channels 3a and 3b opening into the cylinder near its ends, a double-headed piston 5, a crank mounted on the rotatable shaft 7 which can turn freely in the cheeks of the casing 3 and on which is keyed externally of the casing an actuating lever (not illustrated) which can be connected to the mechanism subject to oscillations.

The casing 3 is provided with fixing means 3c enabling it to be attached to a fixed member. Further, the cavity 4 is closed after filling with hydraulic fluid, by a screw plug 8.

Between each of the caps 2 and the cylinder 1 are interposed seals, such as 9, preferably of synthetic rubber or of any other appropriate material which is not subject to attack by oils.

The piston 5 is constituted by an open-ended tube 5a, for instance of steel, and its two ends are radially bent to form an annular abutment 5b for a ring 10 on which bears the seat 11 of the valve 12 which is subjected to the action of a spring 13. Each piston head is further completed by a massive piece 14 having an axial channel 15, the tube 5a being slotted in its middle portion in order to provide an opening 5c communicating via the opening 4a with cavity 4.

The crank comprises a boss 6 and an extension 6a constituting the crank proper and terminating in a head 6b passing through the slot 5c and engaged between the two pieces 14.

Above the cylinder and projecting into the cavity 4 the casing 3 has two thickened portions or bosses 3d acting as housings for return valves. To this end each boss 3d has a bore 3e. These bores 3e have a common axis which intersects the axis of the shaft 7 and is parallel to that of the piston. One end of each bore 3e communicates with the channel 3a and constitutes a seat for the return valve, which comprises a head 16, which may for instance be conical and has a cylindrical skirt which is slidable in bore 3e. Another cylindrical element 16b which is closed at one end by a base 16c and is likewise slidable in bore 3e constitutes an abutment for a spring 17 lodged inside the tubular cylindrical elements and trapped between the head 16 and base 16c. Spring 17 tends to seat the valve head 16.

A cam whose profile is symmetrical with respect to the centre line of the crank 6a is fixed to the shaft 7. This cam can be constituted by the external profile of the crank boss 6.

If the shock absorber has been designed for a predetermined mean load on a vehicle to which it is fitted, the equilibrium position of the crank 6, 6a, 6b under the said predetermined load will be perpendicular to the axis of the piston. The piston will therefore be displaced through an equal stroke in both directions by an oscillation of the crank, the valves 16 being rated to obtain the required damping effect.

But if for instance the vehicle is overloaded the equilibrium position of the crank will be inclined with respect to the perpendicular to the piston axis and an oscillation of the crank will cause unsymmetrical displacements of the piston in the two senses which would be reflected in effects of unequal fluid displacement unless means were provided for exerting on the valves 16 identically similar efforts for re-establishing the equality of the damping actions of the fluid flowing through the channels 3a. This result is obtained by means of the cam which engages as cam-followers the spring abutments 16c.

The circumference of cam 6 comprises two circularly curved portions alternating with two identically similar flat profiles 6d symmetrical disposed with respect to both the axial planes of the shaft 7 containing the center line of the crank and perpendicular to this line respectively, and is therefore such that in the equilibrium position under the predetermined vehicle loading, that is, when the centre line of crank 6a is exactly perpendicular to the axis of the piston, the springs 17 are relaxed to the maximum extent. From the center point of each cam profile 6d the cam radius increases and hence as the cam rotates from its mean or neutral position the abutments 16c compress the springs 17 progressively up to a maximum when the point of contact of the cam and the spring abutment 16c is at the extremity 6c of the flat 6d, the crank then being in its position of maximum inclination.

Even under the normal mean vehicle loading the action of the shock absorber is progressive, since the damping is proportional to the amplitude of the crank's excursion from the neutral position and consequently to the magnitude of the main oscillation.

Likewise, when the vehicle is overloaded so that the neutral position of the crank is altered, the fluid returning through the channel 3a will encounter a progressively greater resistance to lifting of valve head 16 according to the degree which the neutral position of the crank is contained in a plane progressively more inclined to the plane perpendicular to the piston axis.

Oscillations increasing this inclination, even if of small amplitude, will give rise to a powerful damping effect, since they are in fact equivalent to oscillations of large amplitude measured from the normal equilibrium position.

Figure 2:
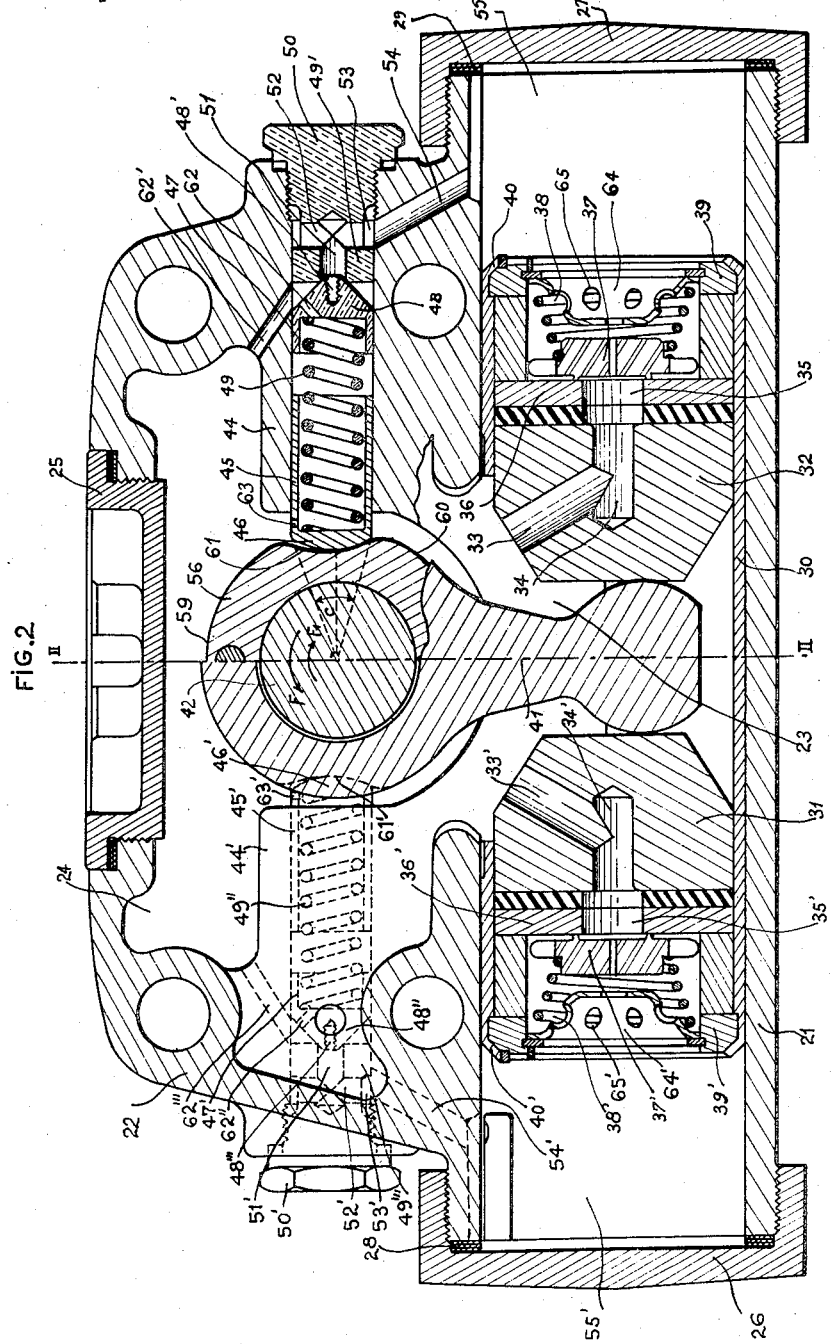
Figure 2 is a vertical section through the axis of the cylinder, of a second form of construction on which has been projected for convenience of exposition the section of one return channel for the fluid with its valve.
Figure 3:
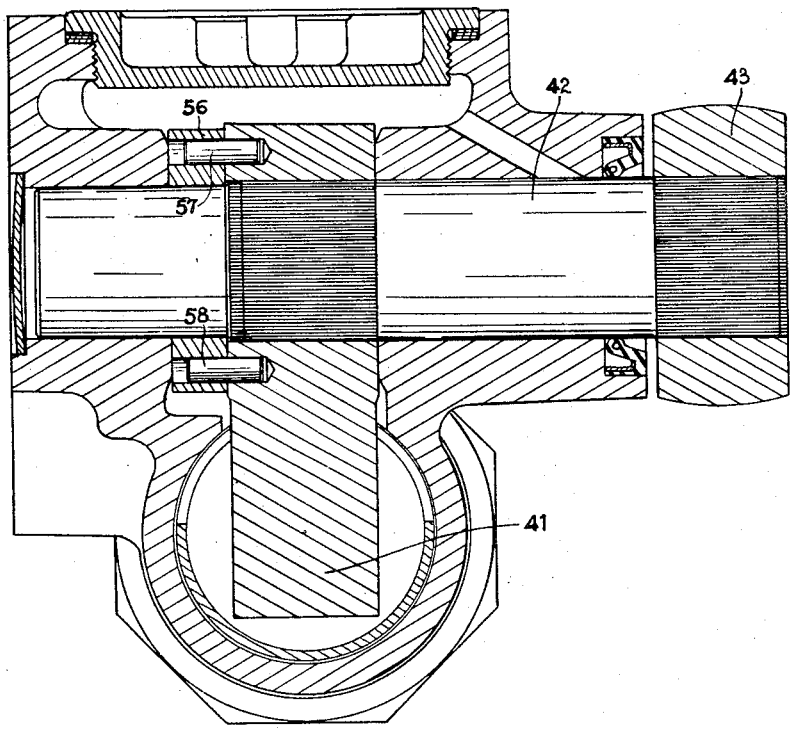
Figure 3 is a section of Figure 2 on the line II—II.

In the modification illustrated in Figures 2 to 4, reference character 21 designates a cylinder on which is superposed a casing 22 formed in one piece with and communicating with the said cylinder by a central passage 23, the cavity 24 of the casing 22 being closed after filling by a suitable plug 25.

The cylinder 21 is closed at both ends by caps 26, 27 with the interposition of seals 28, 29, the said caps being preferably screwed onto the cylinder 21 as shown.

Slidable in the cylinder 21 as a hollow piston 30 with two heads 31 and 32 respectively and provided with channels 33, 34, 33', 34' opening at 35, 35' into pieces 36, 36' constituting the seatings of valves 37, 37' loaded by springs 38, 38' which also abut on abutments 39, 39' which are held in the piston by any appropriate means, for instance by inwardly bent rims 40, 40' of the tubular piston wall 30. Between the heads 31 and 32 is disposed a crank 41 rotatively fast on the shaft 42 (see Figures 3 and 4) on which is keyed the lever 43 which receives the oscillations.

As shown more particularly in Figure 4, the variably loaded valves are aligned on a straight line parallel to the axis of the cylinder and piston, but situated in a different plane perpendicular to crankshaft axis from the parallel plane containing the axis of the piston 30. The two variably loaded valves (of which only one is illustrated) are each disposed in a boss 44 of the casing 22 and each comprises a tubular cam-follower element 45 terminating on the side next to the shaft 42 in a base 46 constituting a spring abutment, and a tubular valve element 47 terminating in a conical head 48, the two tubular elements being held apart from one another by a spring 49'; the point of the conical element constitutes a valve member co-operating with a seat constituted by the rim of an axial passage 51 in a plug 50 communicating with radial passages 52 in the plug, which, in turn, communicate by means of an annular groove 53 in the periphery of the plug with a channel 54 in boss 44 communicating with the corresponding working chamber 55 in one end of the cylinder 21. Openings 62 and 63 in elements 45 and 47 respectively avoid any compression of oil between the elements 45 and 47 when the spring 49' is compressed, and in front of the opening 62 and on the inner side of plug 50 a channel 62' in the boss 44, which channel also communicates with the internal space of the casing 22, enters the bore in which elements 45 and 47 slide.

It is to be observed that the construction of the variably loaded valves is carried out in such a way as to enable their constituent parts to be easily disassembled for replacement of the springs 49'. To that end, it is only necessary to unscrew the plug 50, to insert a suitable tool in a tapped hole 48' of the tubular element 48 which can thus be extracted to give access to spring 49'.

The base 46 of the tubular cam-follower element 45 preferably has the form of a spherical dome which bears on the cam 56 which is keyed to the crank 41 by means of dowels 57, 58 (see Figure 3). The cam 56 is symmetrical with respect to the axial plane of the crankshaft 42 containing the centre line of the crank and also to the axial plane of the crankshaft perpendicular to said centre line. Cam 56 comprises a circular profile 59, 60 and two identically intermediate concave portions of which one is shown at 61.

The operation of the device described above is as follows, it being understood that the members illustrated in Figure 2 are supposed to occupy the position corresponding to the unloaded state of the vehicle equipped with the shock absorber.

If the lever 43 rocks the shaft 42 in the direction of the arrow F the crank 41 will be displaced to the right carrying the piston 30 to the right through a distance corresponding to the amplitude of the oscillation of the shaft 42. As a consequence of this oscillation, each spring 49' is compressed and loads the corresponding valve 48 with a force corresponding to the amplitude of the oscillation, the said loading being exerted on the valve 48 which opposes the passage of the fluid which, during the displacement to the right of piston 30, is expelled from chamber 55 towards the central part of the damper. In fact, during the displacement of piston 30 to the right the oil is expelled from chamber 55 and passes through the channel 54 into the annular groove 53 to flow through the radial passages 52 and axial passage 51 of the plug 50; the oil lifts the valve 48, passes through the channel 62', and reaches the central chamber 23. During this time the chamber 55' is continuously filled with oil which passes from the central chamber 23 through the channels 33' and 34' and opening 35' where it unseats the valve 37'.

When the shaft 42 is oscillated in the direction of arrow $F_1$, the passage of the oil expelled from the chamber 55' into the central chamber 23 takes place by a route similar to that described above and meets an obstacle constituted by the other valve corresponding to the valve 48 and loaded as is the latter by a corresponding spring, the action of the shock absorber being thus symmetrical since the two valves are always loaded in an identically similar manner.

The loading of the spring 49' increases, by reason of the presence of the concave profile 61, as a function of the amplitude of the oscillation and of the loading of the vehicle, the damping becoming stiffer with the latter so long as it does not exceed the maximum permissible loading of the vehicle. Owing to this, the angle at the centre $c$ subtending the concave profile 61, corresponds to twice the angle through which the crank is turned when the vehicle is at rest and carries the maximum permissible load. For loading exceeding this maximum the circular cam profiles 59 and 60 are in contact with the cam follower bases 46 of the valves. These valves are thus loaded to the maximum extent, which loading cannot be increased by any oscillations that may occur. For these portions of the cam the load exerted by the springs 49' on the valves 48 remains constant whatever may be the amplitude of the oscillations transmitted by the lever 43 to the shaft 42.

In the form of construction illustrated and described above the springs 38 and 38' loading the valves 37 and 37' disposed in the heads 31 and 32 of the piston 30 are conical springs. To prevent the coils of these springs from coming into contact on compression so as to form a continuous conical surface which would obstruct the passage of the oil, a stop member 64 provided with openings 65 and limiting the lift of valve 37 or 37' can, for instance, be disposed in each abutment 39, or 39'.

It is to be understood that without departing from the scope of the invention the extent and form, both of the concave parts 61 and of the parts conforming to the circular profile 60 of the cam, can be modified, subject to the condition that the concave parts are identical and symmetrically disposed with respect to both the two mutually perpendicular axial planes of the crank shaft, of which planes one contains the centre line of the crank.

It is further to be understood that within the scope of the invention as defined in the appended claims are included all such modifications and alterations of shape, dimension and arrangement of parts as may be within the competence of those skilled in the art.

We claim:

1. A shock absorber comprising, in combination, a casing in which is formed a cylinder space closed at both ends and a reservoir space for hydraulic fluid which spaces communicate freely with each other, a double-headed hollow piston slidable in said cylinder and defining a working chamber of variable volume at each end of said cylinder, the interior of said piston being in hydraulic communication with the reservoir, a non-return valve in each piston head enabling hydraulic fluid to pass from the interior of the piston into the working chamber adjacent to each valve and comprising a disc-shaped element, a conical spring, and a cup-shaped stop in each head of said double-headed piston, said conical spring engaging with its smaller end said disc-shaped element and maintaining with its larger ends said cup-shaped stop in its respective piston head, said cup-shaped stop limiting the movement of the disc-shaped element away from its seat, a shaft journalled in said casing and capable of oscillating around an axis situated above the axis of the cylinder and perpendicular thereto, a crank fixed on said shaft and engaging the piston intermediate its ends, channels providing hydraulic communication between each working chamber and the reservoir, a non-return valve in each of said channels enabling hydraulic fluid to pass from each chamber into the reservoir, a loading spring for loading each of said non-return valves, two cam-followers, each constituting a movable abutment for one of said loading springs, and a circular cam fast on said shaft comprising two peripheral concavely curved portions symmetrically disposed with respect to two mutually perpendicular axial planes of the crank shaft, one of which planes contains the center line of the crank.

2. A shock absorber comprising, in combination, a casing in which is formed a cylinder space closed at both ends and a reservoir space for hydraulic fluid which spaces communicate freely with each other, a double-headed hollow piston slidable in said cylinder and defining a working chamber of variable volume at each end of said cylinder, the interior of said piston being in hydraulic communication with the reservoir, a non-return valve in each piston head enabling hydraulic fluid to pass from the interior of the piston into the working chamber adjacent to each valve, a shaft journalled in said casing and capable of oscillating around an axis situated above the axis of the cylinder and perpendicular thereto, a crank fixed on said shaft, having a median plane of symmetry and engaging the piston intermediate its ends, channels providing hydraulic communication between each working chamber and the reservoir, a non-return valve in each of said channels enabling hydraulic fluid to pass from each chamber into the reservoir, a valve seat arranged in said casing for each of said last-named non-return valves, a cam follower resiliently connected to each of said last-named non-return valves and a circular disc fixedly connected with said crank shaft and having two peripheral cut-out portions symmetrically disposed with respect to two mutually perpendicular axial planes of said crank shaft, one of which is the median plane of symmetry thereof, said cam followers engaging said cut-out portions of said disc, respectively, thereby urging each of said last-named non-return valves with the same pressure against its respective valve seat.

3. A shock absorber comprising, in combination, a casing in which is formed a cylinder space closed at both ends and a reservoir space for hydraulic fluid which spaces communicate freely with each other, a double-headed hollow piston slidable in said cylinder and defining a working chamber of variable volume at each end of said cylinder, the interior of said piston being in hydraulic communication with the reservoir, a non-return valve in each piston head enabling hydraulic fluid to pass from the interior of the piston into the working chamber adjacent to each valve, a shaft journalled in said casing and capable of oscillating around an axis situated above the axis of the cylinder and perpendicular thereto, a crank fixed on said shaft, having a median plane of symmetry and engaging the piston intermediate its ends, channels providing hydraulic communication between each working chamber and the reservoir, a non-return valve in each of said channels enabling hydraulic fluid to pass from each chamber into the reservoir, said last-named non-return valves being in alignment with each other on an axis which is parallel to that of said cylinder, a valve seat arranged in said casing for each of said last-named non-return valves, a cam follower resiliently connected to each of said non-return valves and a circular disc fixedly connected with said crank shaft and having two peripheral cut-out portions symmetrically disposed with respect to two mutually perpendicular axial planes on the crank shaft, one of which is the median plane of symmetry thereof, said cam followers engaging said cut-out portions of said disc, respectively, thereby urging each of said last-named non-return valves with the same pressure against its respective valve seat.

References Cited in the file of this patent

UNITED STATES PATENTS

| | | |
|---|---|---|
| Re. 18,747 | Gray | Feb. 28, 1933 |
| 1,842,822 | Chryst | Jan. 26, 1932 |
| 2,559,632 | Katz | July 10, 1951 |

FOREIGN PATENTS

| | | |
|---|---|---|
| 745,728 | France | Feb. 21, 1933 |
| 1,033,124 | France | Apr. 1, 1953 |